United States Patent
Freudiger et al.

(10) Patent No.: US 9,929,863 B2
(45) Date of Patent: Mar. 27, 2018

(54) SYSTEM AND METHOD FOR EFFICIENT AND SEMANTICALLY SECURE SYMMETRIC ENCRYPTION OVER CHANNELS WITH LIMITED BANDWIDTH

(71) Applicant: Palo Alto Research Center Incorporated, Palo Alto, CA (US)

(72) Inventors: Julien F. Freudiger, Mountain View, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 94 days.

(21) Appl. No.: 14/928,914

(22) Filed: Oct. 30, 2015

(65) Prior Publication Data
US 2017/0126409 A1 May 4, 2017

(51) Int. Cl.
H04L 9/32 (2006.01)
H04L 9/08 (2006.01)
(Continued)

(52) U.S. Cl.
CPC .......... *H04L 9/3242* (2013.01); *H04L 9/0841* (2013.01); *H04L 9/0861* (2013.01);
(Continued)

(58) Field of Classification Search
CPC ... H04L 9/3242; H04L 9/0891; H04L 63/068; H04L 63/0435; H04L 9/0861;
(Continued)

(56) References Cited

U.S. PATENT DOCUMENTS 7,418,596 B1 * 8/2008 Carroll .................. H04L 63/068
380/247
7,836,151 B2 * 11/2010 Bellotti ............. G06F 17/30041
709/218

(Continued)

OTHER PUBLICATIONS

"How Secure is TextSecure?", International Association for Cryptologic Research, vol. 20141105:123328, Nov. 5, 2014, pp. 1-17. Paragraph [00II].

*Primary Examiner* — Hosuk Song
*Assistant Examiner* — J. Brant Murphy
(74) *Attorney, Agent, or Firm* — Shun Yao; Park, Vaughan, Fleming & Dowler LLP

(57) ABSTRACT

One embodiment of the present invention provides a system for enhancing security in a secure communication channel. During operation, the system collects contextual information associated with a mobile device or a user of the mobile device and determines whether a trigger condition is met based on the collected contextual information. In response to determining that the trigger condition is met, the system performs a first type of key-ratcheting operation on a current cryptographic key to update the cryptographic key. In response to determining that the trigger condition is not met, the system performs a second type of key-ratcheting operation on the current cryptographic key to update the cryptographic key. The system then encrypts a to-be-sent message using an encryption key associated with the updated cryptographic key.

17 Claims, 10 Drawing Sheets

(51) Int. Cl.
*H04L 9/14* (2006.01)
*H04L 29/06* (2006.01)
*H04W 12/02* (2009.01)
*H04W 12/04* (2009.01)

(52) U.S. Cl.
CPC .............. *H04L 9/0891* (2013.01); *H04L 9/14* (2013.01); *H04L 63/0435* (2013.01); *H04L 63/068* (2013.01); *H04W 12/02* (2013.01); *H04W 12/04* (2013.01); *H04L 2209/24* (2013.01)

(58) Field of Classification Search
CPC . H04L 9/0841; H04L 2209/24; H04L 9/0814; H04L 9/14; H04W 12/02; H04W 12/04
See application file for complete search history.

(56) References Cited

U.S. PATENT DOCUMENTS

| | | | | |
|---|---|---|---|---|
| 9,306,741 B1* | 4/2016 | Brainard | | H04L 63/08 |
| 9,817,720 B2* | 11/2017 | Horn | | G06F 11/1402 |
| 2002/0199102 A1* | 12/2002 | Carman | | H04L 9/083 |
| | | | | 713/168 |
| 2003/0193910 A1* | 10/2003 | Shoaib | | H04W 36/24 |
| | | | | 370/331 |
| 2006/0078110 A1* | 4/2006 | Kim | | G06Q 20/3829 |
| | | | | 380/30 |
| 2009/0068985 A1* | 3/2009 | Nguyen | | H04L 9/0844 |
| | | | | 455/411 |
| 2011/0167340 A1* | 7/2011 | Moore | | G06F 3/0233 |
| | | | | 715/257 |
| 2011/0213977 A1* | 9/2011 | Little | | H04W 12/04 |
| | | | | 713/171 |
| 2013/0308779 A1* | 11/2013 | Little | | H04W 12/04 |
| | | | | 380/270 |
| 2014/0082348 A1* | 3/2014 | Chandrasekaran | | H04L 63/0254 |
| | | | | 713/150 |
| 2015/0104019 A1* | 4/2015 | Lu | | H04W 12/04 |
| | | | | 380/270 |
| 2015/0271144 A1* | 9/2015 | Ronca | | H04L 63/0428 |
| | | | | 713/168 |
| 2016/0226911 A1* | 8/2016 | Boss | | H04L 63/20 |

* cited by examiner

SYSTEM AND METHOD FOR EFFICIENT AND SEMANTICALLY SECURE SYMMETRIC ENCRYPTION OVER CHANNELS WITH LIMITED BANDWIDTH

BACKGROUND

Field

This disclosure is generally related to symmetric encryption schemes. More specifically, this disclosure is related to an encryption-key ratcheting mechanism that can adaptively update encryption keys.

Related Art

The prevalence of mobile computing devices (such as smartphones and tablet computers) and the ever-increasing applications (also called apps), developed for these mobile devices have enabled mobile device users to perform many more tasks, including both personal or business related, on these devices. For example, a user can access his bank account or an enterprise data server, through his smartphone. As a result, sensitive information is exchanged between the smartphone and those servers. Keeping such sensitive information secure becomes increasingly important in mobile computing.

One straightforward way of providing data security on mobile devices is to encrypt messages sent to or from the mobile devices. Among various encryption schemes, a symmetric-key algorithm that uses block ciphers, as defined by the Advanced Encryption Standard (AES), is the most popular encryption scheme used by mobile communications. Like other symmetric-key algorithms, the cryptographic key used in AES is a shared secret between the communication partners. The secrecy of the communication relies on the secrecy of the key. To prevent the key from being compromised by malicious third parties, it is desirable to have the key updated regularly. Some approaches rely on key-ratcheting mechanisms that continuously ratchet the key material forward to update the encryption keys over time. In principle, these key-ratcheting mechanisms can achieve semantic security and provide past secrecy (through key erasure) and possibly future secrecy. Note that the term "future secrecy" means that the system can "heal" itself (by introducing new ratchet keys) if an individual key is compromised. However, ratcheting keys can introduce additional communication overhead, especially if the key is updated for each message.

SUMMARY

One embodiment of the present invention provides a system for enhancing security in a secure communication channel. During operation, the system collects contextual information associated with a mobile device or a user of the mobile device and determines whether a trigger condition is met based on the collected contextual information. In response to determining that the trigger condition is met, the system performs a first type of key-ratcheting operation on a current cryptographic key to update the cryptographic key. In response to determining that the trigger condition is not met, the system performs a second type of key-ratcheting operation on the current cryptographic key to update the cryptographic key. The system then encrypts a to-be-sent message using an encryption key associated with the updated cryptographic key.

In a variation on this embodiment, the first type of key-ratcheting operation provides a higher level of security than the second type of key-ratcheting operation.

In a further variation, the first type of key-ratcheting operation involves a Diffie-Hellman key-ratcheting operation, and the second type of key-ratcheting operation involves a hash-based key-ratcheting operation.

In a variation on this embodiment, the contextual information includes one or more of: a time interval since a previous key-ratcheting operation of the first type is performed, a current bandwidth of the communication channel, the user's location, the user's motion patterns, network traffic patterns, and a battery life of the mobile device.

In a variation on this embodiment, the secure communication channel includes: a Wi-Fi channel, a channel over 3G or 4G cellular networks, and a short message service (SMS) channel.

In a variation on this embodiment, the encryption key is derived from the updated cryptographic key using a hash-based key derivation function (HKDF).

In a variation on this embodiment, the system further computes a message authentication code (MAC) over the encrypted message, and transmits the encrypted message along with the MAC over the secure communication channel.

BRIEF DESCRIPTION OF THE FIGURES

In the figures, like reference numerals refer to the same figure elements.

DETAILED DESCRIPTION

Figure 1:
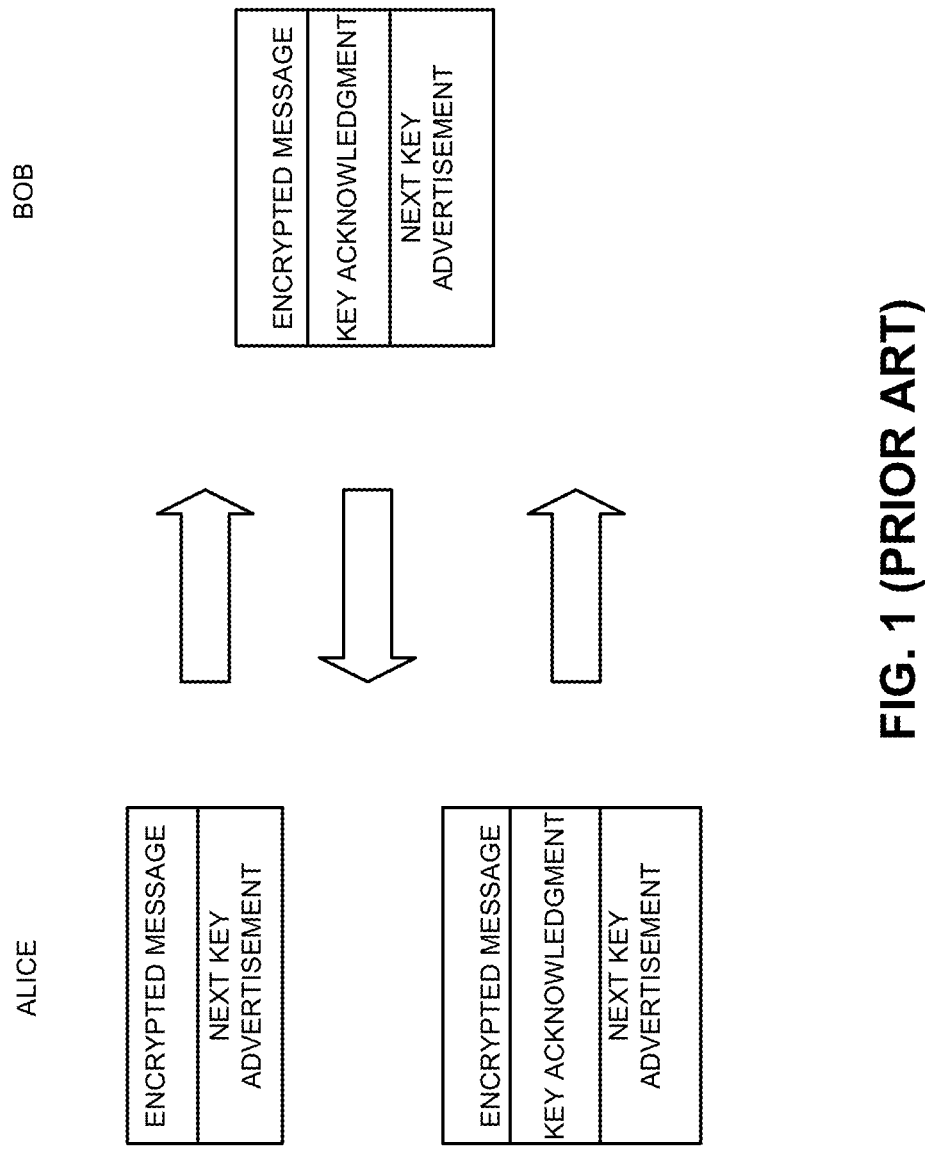
FIG. 1 presents a diagram illustrating an existing key-ratcheting mechanism.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide an adaptive key-ratcheting system that can automatically and dynamically adjust the key-ratcheting speed based on a plurality of parameters, including but not limited to: user motilities, communication patterns, security requirements, etc. In some embodiments, the key-ratcheting is performed over Short Message Service (SMS) channels, which has a limited bandwidth. The adaptive approach for key-ratcheting can reduce the number of needed ratchets, thus reducing the overall communication overhead caused by key-ratcheting.

AES Encryption and Key-Ratcheting

AES is a symmetric encryption algorithm based on the Rijndael block cipher. In cryptography, a block cipher is a deterministic algorithm operating on fixed-length groups of bits, called "blocks," with an unvarying transformation specified by a symmetric key. AES operates with a fixed block length of 128 bits, and supports key lengths of 128, 192, or 256 bits. For example, AES can take a 128-bit block of plaintext as input, and output a corresponding 128-bit block of ciphertext, using a 128-bit, 192-bit, or 256-bit encryption key.

Because a block cipher is suitable only for the encryption of a single block under a fixed key, a multitude of modes of operation have been designed to allow their repeated use in a secure way. More specifically, a mode of operation describes how to repeatedly apply a cipher's single-block operation to securely transform amounts of data larger than a block. The simplest of the encryption modes is the Electronic Codebook (ECB) mode, which divides a message into blocks, and encrypts each block separately. Cipher Block Chaining (CBC) is another mode of operation. In CBC mode, each block of plaintext is XORed with the previous ciphertext block before being encrypted. This way, each ciphertext block depends on all plaintext blocks processed up to that point. Counter (CTR) mode, on the other hand, is a mode of operation that turns a block cipher into a stream cipher. To do so, it generates the next keystream block by encrypting successive values of a "counter." Although the counter can be any function that can produce a non-repeating sequence, in practice, most encryption schemes implement an increment-by-one counter. There are many other modes of operation, such as Cipher Feedback (CFB), Output Feedback (OFB), etc.

In this disclosure, AES in CTR mode (AES-CTR) is used as an example when expanding the various embodiments. However, the scope of the invention is not limited by the encryption scheme.

Many modes of operations, including CTR mode, take as input the to-be-encrypted plaintext, a symmetric encryption key, and a unique sequence called an Initialization Vector (IV). Unlike the plaintext and the encryption key that must be kept secret, the IV does not need to be kept secret, and can be sent in plaintext alongside the ciphertext. In general, the IV needs to be non-repeating, and depending on the mode of operation, the IV may need to be random or pseudorandom. The usage of the IV by an encryption scheme provides semantic security, a property whereby repeated usage of the scheme under the same key does not allow an attacker to infer relationships between segments of the encrypted message, because the IV ensures distinct ciphertext being produced each time. An IV used in AES-CTR can include a randomly generated nonce concatenated with a message counter.

Although an IV is an essential component for many modes of operation of the AES, key-ratcheting mechanisms that change encryption keys for every message make the use of IVs irrelevant. For example, in AES-CTR, there is no longer a need to transmit an IV as long as the encryption key changes for each and every message. In other words, in addition to past and possible future secrecy, such key-ratcheting mechanism can also provide semantic security.

FIG. 1 presents a diagram illustrating an existing key-ratcheting mechanism. In FIG. 1, Alice sends an encrypted message to Bob. Along with the actual message content, Alice "advertises" a new key that she will use in the future. Upon receiving Alice's message, Bob sends back an encrypted message to Alice. Along with the actual message content, Bob "acknowledges" the key that Alice advertised, and also advertises his own next key. Alice will then use the advertised and acknowledged key the next time she sends a message. Although this mechanism can provide both future and past secrecy, it generates significant overhead, because the key-ratcheting is performed for each and every message. In addition, this scheme requires the exchange of two messages before a key can be updated.

In some embodiments of the present invention, in order to reduce the overhead of key-ratcheting without compromising security, the system adaptively ratchets encryption keys. More specifically, instead of ratcheting encryption keys for each message, the system selects appropriate times for ratcheting based on various dynamic factors, including but not limited to: the time of the day, the location of the user, the bandwidth of the available communication channel, the communication patterns of the user, and any combinations thereof. For example, to reduce the cost for the user (especially in cases of international travel), certain mobile applications may be configured to communicate with their servers over an SMS channel when the mobile device does not have access to a Wi-Fi channel. Unlike Wi-Fi that allows packets with size up to 1500 bytes, SMS limits the packet size to 140 bytes. The limited bandwidth provided by SMS means that any key-ratcheting operation can result in significant overhead. Hence, to reduce the communication overhead, in some embodiments of the present invention, the system can be configured to perform key-ratcheting operation only when it detects that the mobile device has access to Wi-Fi.

Figure 2A:
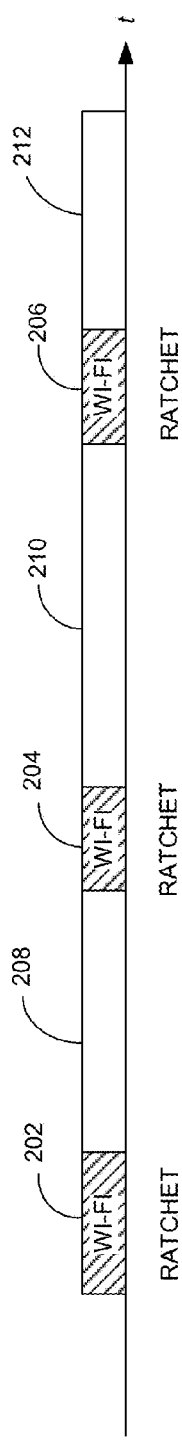
FIG. 2A presents a diagram illustrating an exemplary key-ratcheting timeline, in accordance with an embodiment of the present invention.

FIG. 2A presents a diagram illustrating an exemplary key-ratcheting timeline, in accordance with an embodiment of the present invention. In FIG. 2A, a mobile device is on the move, and can have access to Wi-Fi channels at various discrete time periods. For example, the user of the mobile device may be at home, at work, or at certain public locations (e.g., airports or coffee shops) that have access to Wi-Fi during time periods 202, 204, and 206. During other time periods (e.g., periods 208, 210, and 212), the mobile device does not have Wi-Fi access. As a result, applications that need to connect to their server via a secure channel have to rely on other band-limited communication channels, such as SMS. In the example shown in FIG. 2A, the system is configured to only perform key-ratcheting during those time periods that the mobile device is connected to Wi-Fi. During time periods that the mobile device is not connected to Wi-Fi, the system may continue to use the current encryption key without ratcheting. Alternatively, the system may perform intermittent key-ratcheting when the mobile device is not connected to Wi-Fi. For example, the system may perform key-ratcheting every 5 or 10 minutes, even if the mobile device is not on Wi-Fi. The overhead generated by the less frequent key-ratcheting can be significantly less.

Not all key-ratchetings are created equal. One simple way to ratchet an encryption key is to repeatedly hash it. Because there is no message exchange between the communication partners when the key is updated, this approach does not generate overhead. However, this simple approach can only provide past secrecy but not future secrecy. Another approach for ratcheting a key is the Diffie-Hellman (DH) ratcheting operation, which performs a DH key exchange for each message. DH ratcheting can provide both past and future secrecy, but will generate significant overhead. To reduce overhead while improving security, in some embodiments, the system can perform the DH ratchet during the Wi-Fi-connected periods, and perform the less secure hash-based ratcheting during other periods.

Figure 2B:
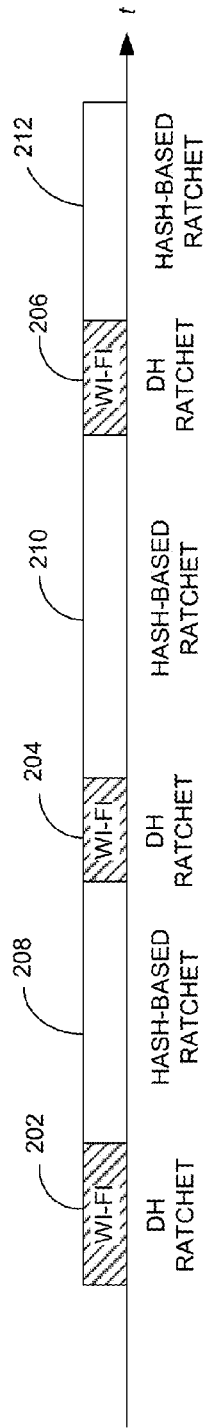
FIG. 2B presents a diagram illustrating an exemplary key-ratcheting timeline, in accordance with an embodiment of the present invention.

FIG. 2B presents a diagram illustrating an exemplary key-ratcheting timeline, in accordance with an embodiment of the present invention. Similar to what is shown in FIG. 2A, in FIG. 2B, the mobile device is connected to Wi-Fi during time periods 202, 204, and 206, and does not have Wi-Fi access during time periods 208, 210, and 212. In the example shown in FIG. 2B, when the mobile is connected to Wi-Fi, the system performs the DH ratcheting; otherwise, the system performs the hash-base ratcheting. Note that the DH ratcheting may be performed for each message, or the system may perform the DH ratcheting intermittently (e.g., every 5 minutes) during the period that the mobile device is connected to Wi-Fi. The hash-based ratcheting can be performed for each message because it does not create overhead.

Figure 2C:
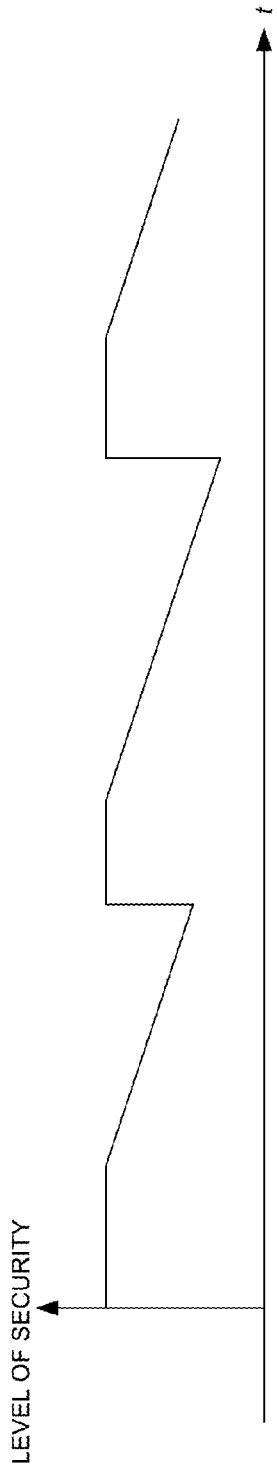
FIG. 2C presents a diagram illustrating the level of security as a function of time, in accordance with an embodiment of the present invention.

FIG. 2C presents a diagram illustrating the level of security as a function of time, in accordance with an embodiment of the present invention. More specifically, FIG. 2C illustrates conceptually the security level provided by the system according to the key-ratcheting timeline shown in FIG. or 2B. As one can see in FIG. 2C, the system can obtain a higher level of security when DH ratcheting is performed, and the level of security provided gradually decreases with time if no more DH ratcheting is performed. Note that, for simplicity of illustration, the security level is shown to decrease as a linear function of time. In practice, the decrease of the security level may be impacted by various factors and may not be a linear function of time. FIG. 2C also illustrates that, each time DH ratcheting is performed, the security level is restored to the higher level. Hence, to prevent the security level from becoming dangerously low, the system may perform DH ratcheting even when the mobile device is not connected to Wi-Fi.

Figure 3A:
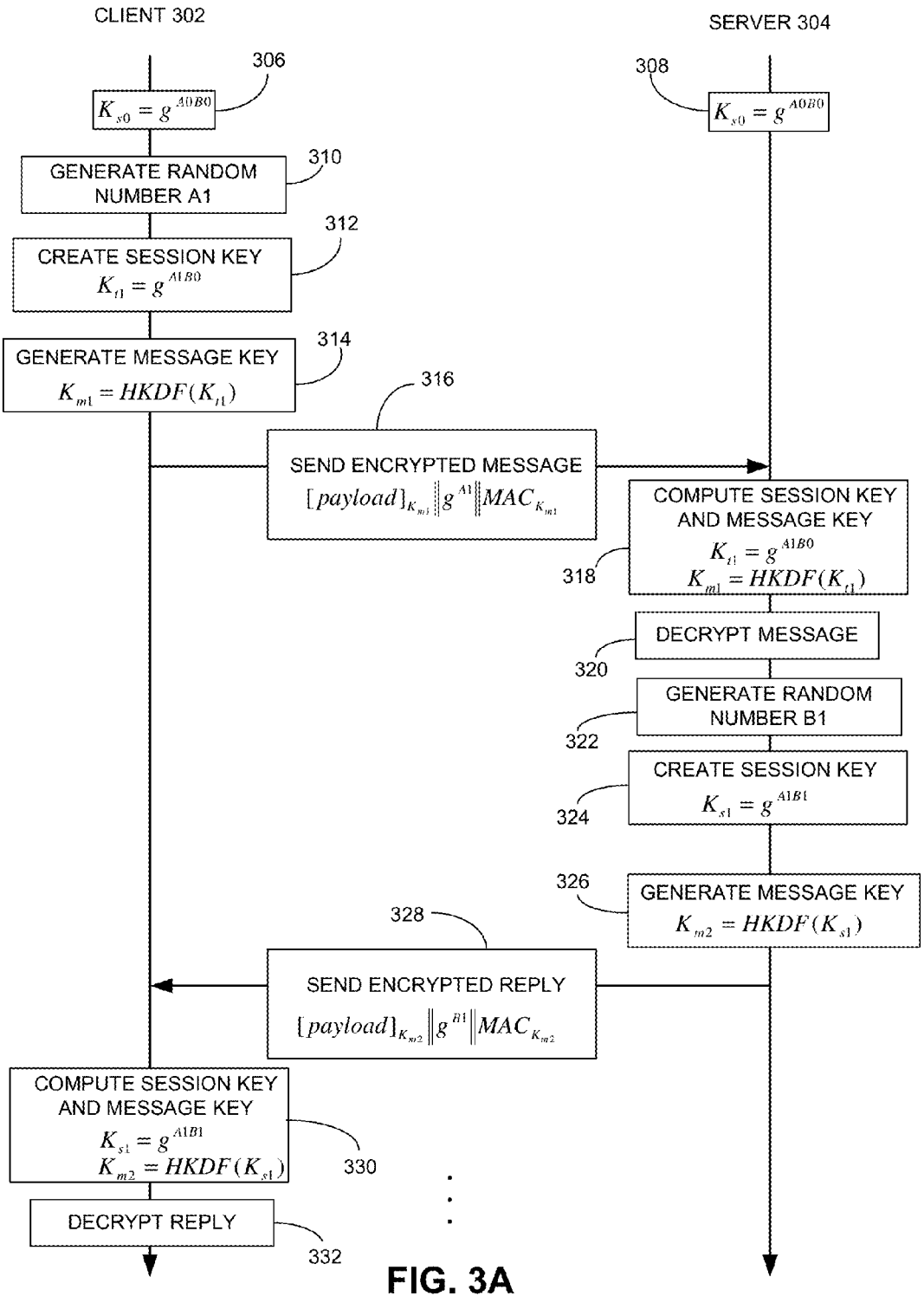
FIG. 3A presents a diagram illustrating an exemplary process for DH ratcheting, in accordance with an embodiment of the present invention.

FIG. 3A presents a diagram illustrating an exemplary process for DH ratcheting, in accordance with an embodiment of the present invention. In FIG. 3A, client 302 and server 304 both have knowledge of previous session key (or the DH master key if this is the first DH operation) $K_{s0}=g^{A0B0}$ (operations 306 and 308). Client 302 knows random number A0 and server 304 knows random number B0. During operation, client 302 generates a random number A1 (operation 310), and creates a temporary session key $K_{t1}=g^{A1B0}$ (operation 312). This temporary session key is the result of the ratcheting mechanism. Using the session key, client 302 can create a message key $K_{m1}=HKDF(K_{t1})$, which is to be used for encrypting messages (operation 314). Note that the function HKDF is a hash message authentication code (HMAC)-based key derivation function (KDF). Detailed descriptions of the HKDF function can be found in RFC5869 of the Internet Engineering Task Force (IETF), available at the IETF website.

Client 302 then encrypts a message using the message key and sends the encrypted message along with random number A1 and a message authentication code (MAC) (operation 316). The MAC is used for authenticating the message, and can be generated based on cryptographic hash functions, such as HMAC. Detailed descriptions of the HMAC function can be found in RFC2104 of the Internet Engineering Task Force (IETF), available at the IETF website. In the example shown in FIG. 3A, the generation of the MAC involves the message key.

Upon receiving the encrypted message, server 304 computes the temporary session key and the message key (operation 318). Server 304 can decrypt the received message using the session key (operation 320). Subsequently, server 304 generates a random number B1 (operation 322) and creates a new session key $K_{s1}=g^{A1B1}$ using A1 and B1 (operation 324). Using the new session key, server 304 generates a new message key $K_{m2}=HKDF(K_{s1})$ (operation 326). The new message key can be used by server 304 for encryption of the reply message and the MAC. Server 304 can then send the encrypted reply along with random number B1 and the MAC to client 302 (operation 328). Client 302 can then compute the new session key and the new message key (operation 330), and decrypt the reply (operation 332). Note that the new session key is the result of the key-ratcheting, and client 302 uses the new message key to encrypt the next message to server 304.

Figure 3B:
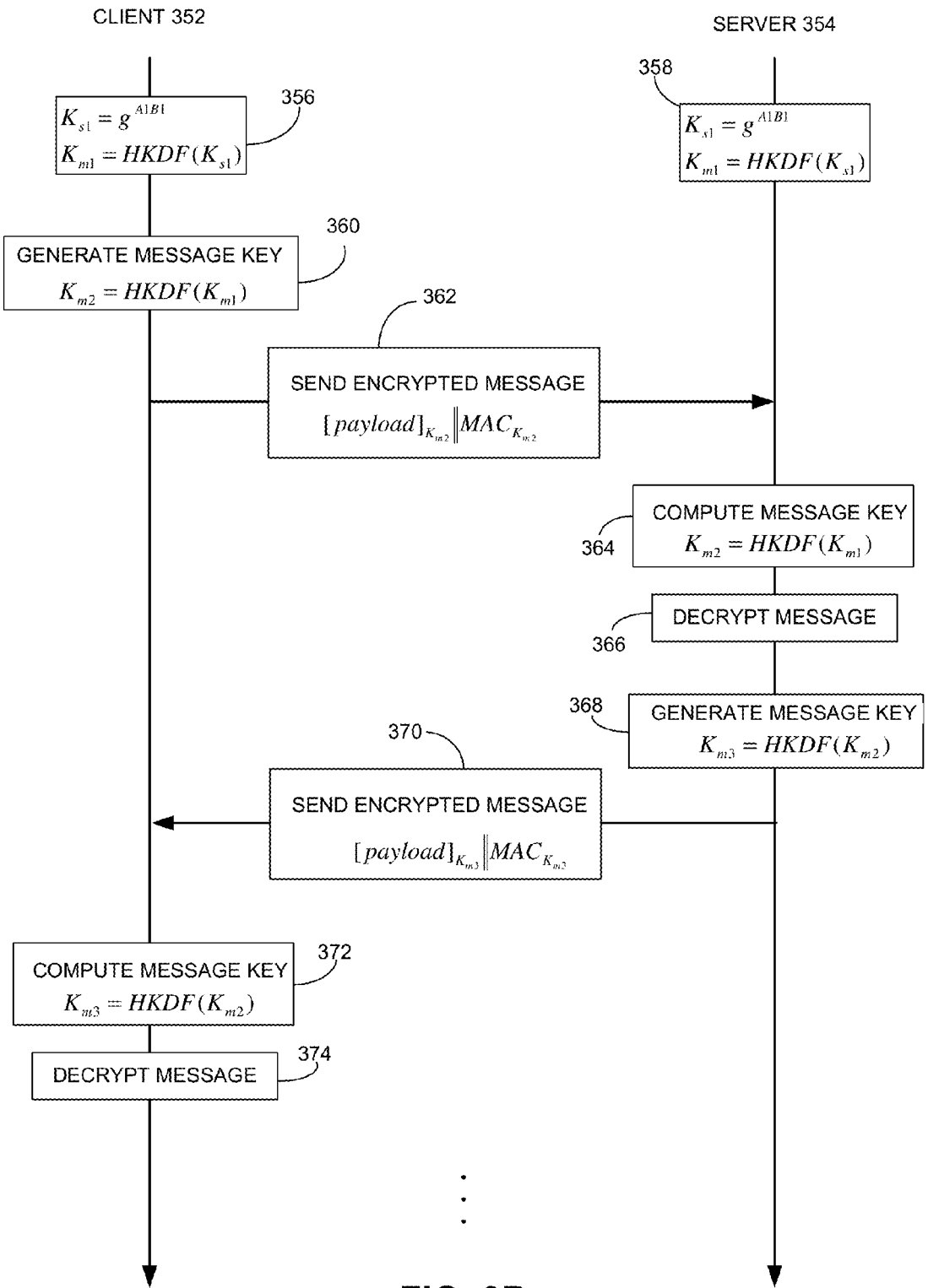
FIG. 3B presents a diagram illustrating an exemplary process for hash-based ratcheting, in accordance with an embodiment of the present invention.

FIG. 3B presents a diagram illustrating an exemplary process for hash-based ratcheting, in accordance with an embodiment of the present invention. In FIG. 3B, assuming at the start of a new session, client 352 and server 354 both have knowledge of previous session key $K_{s1}=g^{A1B1}$ and the first message key $K_{m1}=HKDF(K_{s1})$ (operations 356 and 358). During operation, client 352 generates a message key $K_{m2}=HKDF(K_{m1})$ used for message encryption (operation 360). Client 352 encrypts a message using the newly generated message key and sends the encrypted message along with a MAC (operation 362).

Upon receiving the encrypted message, server 354 computes the message key (operation 364), and decrypts the message using the computed message key (operation 366). Server 354 can generate a message key $K_{m3}=HKDF(K_{m2})$ by hashing the computed message key (operation 368). Server 354 then uses the newly generated message key to encrypt a message and sends the encrypted message along with a MAC to client 352 (operation 370). Client 352 receives the message, computes a current message key using the previous message key (operation 372), and decrypts the message using the computed message key (operation 374). Note that, each time client 352 or server 354 sends or receives a message, it updates the message key using the HKDF function. As one can see from FIG. 3B, the information exchanged between client 352 and server 354 includes only the encrypted message and the MAC, and incurs no overhead.

In the example shown in FIGS. 2A-2B, the decision whether to ratchet keys is made based on whether the mobile device is connected to Wi-Fi. In practice, other factors may also need to be considered, including but not limited to: the duration since the last key-ratcheting operation, the location of the user, whether the user is sending/receiving sensitive information, or whether the mobile device is currently in motion (which can lead to lower channel quality).

As shown in FIG. 2C, refraining from performing the more secure DH ratcheting for a longer period of time can be risky. Hence, the system may keep track of the time of each ratchet. If the system determines that the difference between the current time and the time of the last ratchet exceeds a threshold, the system may perform the DH ratcheting. The system can also track the location of the user based on the connected Wi-Fi access points or base stations of cellular networks, and performs DH ratcheting each time it detects a location change. Moreover, the system may define a number of secure locations and suspend the more secure and more computationally expensive DH ratcheting if it detects that the user is at a secure location. For example, when the user is within his company, using his company's secure Wi-Fi network to communicate with his colleagues, the system may consider such communication secure in nature and not requiring the more secure DH ratcheting. Similarly, the system may also define a number of insecure locations. For example, if the user is in a hostile environment and the likelihood of someone trying to gain access to his messages is high, the system may be configured to perform DH ratcheting for each message, even in situations where Wi-Fi or other high-bandwidth channels are not available.

Alternatively, the system may monitor the user's communication pattern and perform key ratcheting (e.g., DH ratcheting) each time the user has sent/received a certain number of messages. This prevents the situation in which a maliciously party accumulates enough knowledge of the hash-ratcheted encryption keys. In addition, the user may define his security preferences. For example, if the user is communicating with his friends regarding a movie they both have seen, the user may consider such communication benign and not requiring key-ratcheting. The system can also determine whether a message is sensitive based on the context of the message. For example, the system may compile a set of sensitive words; if a message includes a sensitive word, it can be marked sensitive. As a result, before the message is sent, a DH ratcheting is performed to ensure that a new session key is generated for that message. Other considerations can include network traffic patterns, battery life, and outputs of other sensors. Heavy network traffic may prompt the system to delay ratcheting. Similarly, a low battery life may also cause the system not to perform ratcheting unless in high-risk situations. Outputs from sensors equipped on the mobile device may help the system to determine additional contextual information that may not be otherwise available. For example, in situations where the user's location cannot be determined based on the network access point, the system may obtain the location information from a GPS (Global Positioning System) module.

Figure 4:
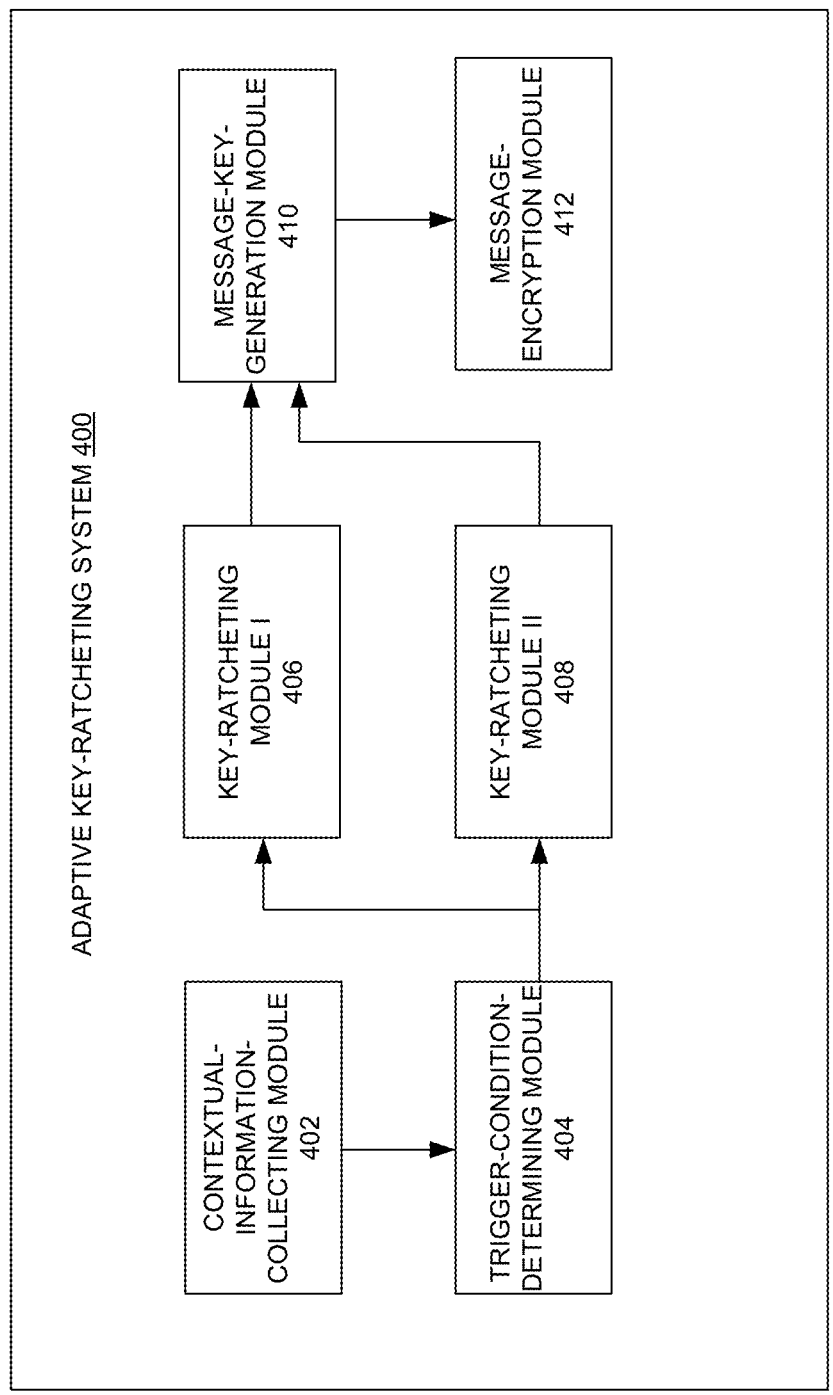
FIG. 4 presents a diagram illustrating an exemplary system for adaptive key-ratcheting, in accordance with an embodiment of the present invention.

FIG. 4 presents a diagram illustrating an exemplary system for adaptive key-ratcheting, in accordance with an embodiment of the present invention. In FIG. 4, adaptive key-ratcheting system 400 includes a contextual-information-collecting module 402, a trigger-condition-determining module 404, a key-ratcheting module I 406, a key-ratcheting module II 408, a message-key-generation module 410, and a message-encryption module 412.

Contextual-information-collecting module 402 is responsible for collecting contextual information associated with a mobile device and the user of the mobile device. In some embodiments, contextual-information-collecting module 402 can couple to various sensors equipped on the mobile device in order to collect the contextual information. Such information is sent to trigger-condition-determining module 404, which determines whether a key-ratcheting trigger condition has been met. The output of trigger-condition-determining module 404 can be configured to turn on one of the key-ratcheting modules. Key-ratcheting module I 406 is configured to perform the more secure key-ratcheting operation at the cost of increased communication overhead. Key-ratcheting module II 408 is configured to perform a less secure key-ratcheting operation, but incurs no overhead. During operation, the key-ratcheting modules are configured to access the internal memory of the mobile device to obtain a session key that is currently in use, and then performs the corresponding ratcheting operation on the session key. To further provide security, the outputs of the key-ratcheting modules are sent to message-key-generation module 410, which can use an HKDF function to generate a message key. Message-encryption module 412 can then use the message key to encrypt the message.

Figure 5:
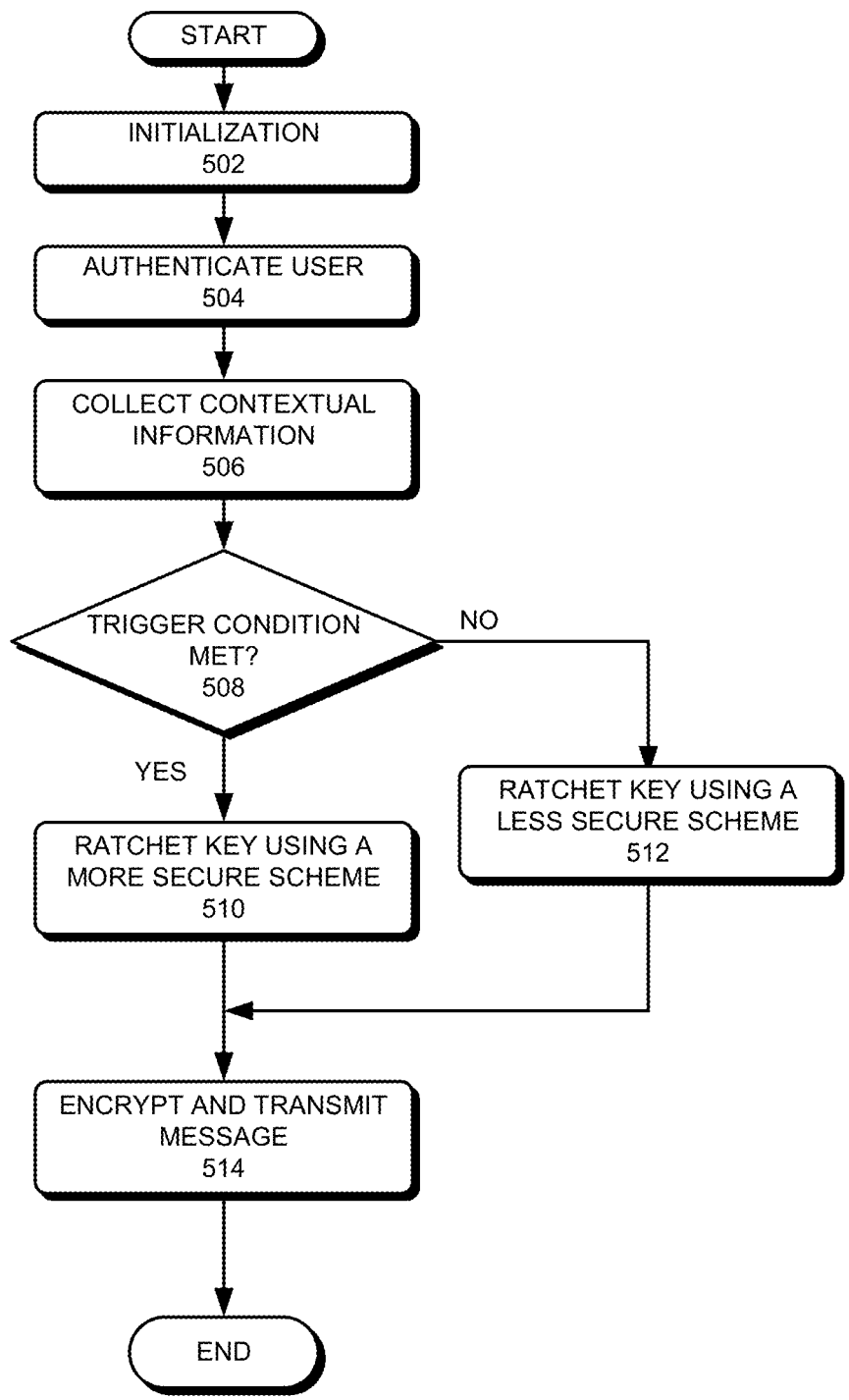
FIG. 5 presents a diagram illustrating an exemplary communication process, in accordance with an embodiment of the present invention.

FIG. 5 presents a diagram illustrating an exemplary communication process, in accordance with an embodiment of the present invention. During operation, the system initializes (operation 502). For client-to-sever communication, the system initializes the client and the server. For peer-to-peer communication, the system initializes both client devices. The initialization process typically involves key establishment, the goal of which is to communicate a long-term shared secret (also called a master key) between the client and the server (or a peer of the client). It can be assumed that the mobile device is connected to Wi-Fi or other high-bandwidth channels (e.g., the 3G or 4G cellular network) during initialization. Various approaches can be used for establishing the master key. In some embodiments, a standard key-exchange procedure, as defined by the Transport Layer Security (TSL) protocol, can be used to establish the master key. Detailed descriptions of the TLS protocol can be found in RFC5246 of the Internet Engineering Task Force (IETF), available at the IETF website. According to TLS, there are two possible approaches to key establishment, including the direct transmission of an RSA-encrypted pre-shared secret and the Diffie-Hellman (DH) key exchange. Both approaches require operating in a 2048-bit space for good security. The DH key exchange has a slightly higher communication overhead. If the key exchange is carried out using SMS messages that are 140 bytes long, the DH key exchange may require up to 8 SMS messages, whereas the approach based on the pre-shared secrete only requires 4 SMS messages for key establishment.

Once the master key is generated, it must be safely stored on the mobile device. Various approaches can be used to ensure the safety of the master key. One solution is to store the master key in the internal storage associated with the application that uses the master key. In addition, one may want to encrypt the master key using a key that is not accessible to the application.

After the establishment of the secure channel, the user needs to be authenticated (operation 504). This can be done using a challenge-response protocol, such as the Password Authentication Protocol (PAP), Challenge-Handshake Authentication Protocol (CHAP), and Extensible Authentication Protocol (EAP).

Prior to the mobile device transmitting or receiving messages from the server or peers, the system collects contextual information associated with the user and the mobile device (operation 506). As discussed previously, various contextual information can be collected by the mobile device, including but not limited to: time and location information, the user's mobility information, information associated with the user's communication pattern, the internet accessibility (whether the mobile device is connected to Wi-Fi or other high-bandwidth data channels), information related to network traffic, battery life, and outputs of various sensors on the mobile device. Some of the contextual information is related to user behavior, while some may be related to the network environment of the mobile device.

The system then determines, based on the collected contextual information, whether a trigger condition is met (operation 508). If so, the system performs a key-ratcheting operation that can provide a higher level of security (operation 510). For example, the system may perform the DH ratcheting, which can involve exchanging messages over a Wi-Fi channel or an SMS channel if Wi-Fi is unavailable. Note that, for SMS-based application, this approach incurs low overhead, because it piggybacks on existing communications over Wi-Fi to reduce the SMS channel usage. Even when only SMS is available, as shown in FIG. 3A, the DH ratcheting does not require the use of extra SMS messages, and can be fitted into existing communications. The overhead caused by the DH ratcheting can be reduced by using Elliptic Curve DH (ECDH), which uses DH on algebraic structures of elliptic curves over finite fields instead of plain finite fields. Using ECDH, the overhead can be reduced to 42 bytes in two messages.

If the trigger condition is not met, the system performs a key-ratcheting that only provides a relatively low level of security or the system may not ratchet the key (operation 512). For example, the system may perform the hash-based ratcheting, which incurs no overhead. Note that, because the packets used for the hash-based ratcheting remain the same (as shown in FIG. 3B), this scheme fits well with the band-limited SMS channel. In addition to the hash-based ratcheting, the system may update the IV (which is part of the information exchanged between communication partners in the AES-CTR mode) and key using the same encryption key. One way to do so is to rely on message counters to update the IV. In cases where the message counter is unavailable, the client and the server can each maintain a cached message counter. For every message exchanges, both parties increment their counters to maintain synchronization. This approach does not increase the overhead and has a small memory footprint.

As discussed previously, there are various criteria in defining the trigger condition. One simple approach is to define the trigger condition based on the time and the availability of communication channels. More specifically, the system can define two timing thresholds, a ratchet interval and a maximum ratchet interval. The trigger condition can be met if the mobile device is connected to Wi-Fi and the time interval since the last ratcheting operation exceeds the ratchet interval. Alternatively, the trigger condition can be met if the mobile device remains stationary and there is no limit on the number of SMS messages that can be sent. This is because a moving mobile device can result in degraded channel quality, which can lead to the unsuccessful transmission of SMS messages, and thus is not a suitable condition for DH key-ratcheting. Similarly, because DH ratcheting generates overhead, it should be performed when there is no limit in the number of allowed SMS messages. Finally, the trigger condition will be met if the time interval since last ratcheting operation exceeds the maximum ratchet interval. Note that this maximum ratchet interval consideration overrides all other considerations. In other words, when the maximum ratchet interval is reached, regardless of the network connectivity situation (i.e., whether the mobile device is connected to high-bandwidth channels or band-limited channels), the system will perform the DH ratcheting to generate a new key.

Subsequently, the system encrypts the message using a message key derived from the ratcheted key and transmits the encrypted message (operation 514).

The exemplary process shown in FIG. 5 can be performed by either party of a secure communication. In cases of client-server communication, the client may determine, based on its own contextual information, whether to perform the more secure ratcheting. On the other hand, the server can also obtain contextual information from the client, and uses such information to determine whether to perform secure ratcheting. Alternatively, the server may also impose its own rules and initiates secure ratcheting when a certain trigger condition has been met. In cases of peer-to-peer communication, either client device can initiate secure ratcheting if it determines based on its own contextual information that the trigger condition has been met.

Secure SMS-Based Mobile Application

As discussed previously, SMS can provide a low-cost way of communication, and various mobile applications can be developed using SMS as a communication channel to avoid paying the higher roaming fees of the 3G or 4G cellular data network. For example, the client running on a mobile device can compress the HTTP (Hypertext Transfer Protocol) traffic into a series of SMS messages that are sent over the 2G networks. These SMS messages are read at the server of the application and recombined into HTTP messages that can be forwarded to other online services. The same can happen for messages sent back from the server to the client. As a result, using the band-limited SMS channel, the user of the mobile device can access various online services. However, one significant drawback of this approach is the lack of security of the SMS channel. More specifically, current SMS communications are unencrypted, and can be subject to many possible attacks. For example, intermediaries (e.g., cellular network operators and SMS routers) can passively collect the SMS content. Worse yet, an active attacker can inject, modify, or relay SMS messages, and even obtain full control of the communications via a man-in-the-middle attack.

Providing security for SMS-based apps can be challenging due to inherent constraints associated with the SMS channels. More specifically, the SMS packet size is limited to 140 bytes, and SMS transport can be unreliable, because there is no guarantee of delivery, ordering, timing, or duplicate protection. Existing SMS security approaches are either not secure enough (e.g., not providing future secrecy) or incur too much communication overhead.

Figure 6:
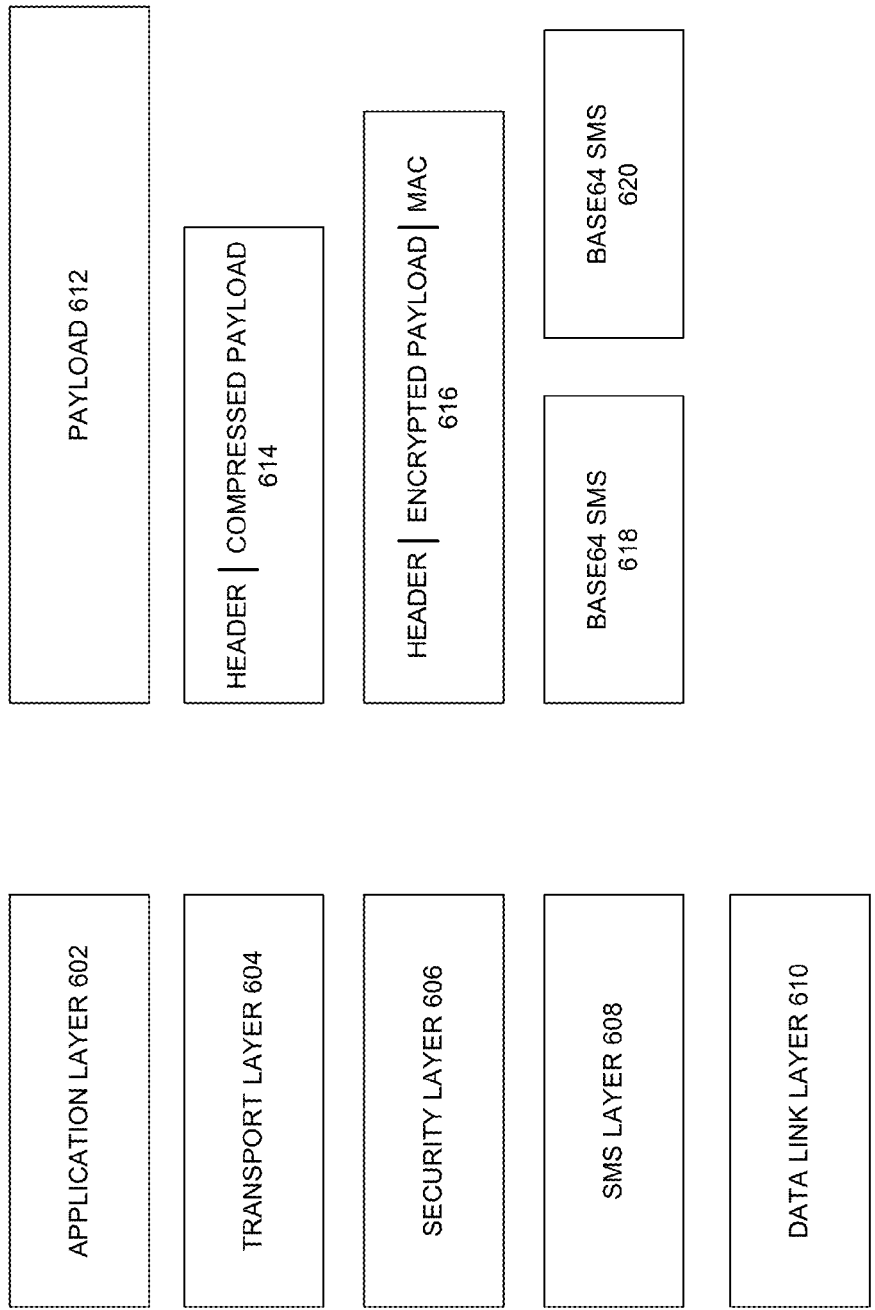
FIG. 6 presents a diagram illustrating an exemplary communication stack for a secure SMS-based mobile application, in accordance with an embodiment of the present invention.

The adaptive key-ratcheting system allows for securely encrypted SMS communications with reduced overhead. FIG. 6 presents a diagram illustrating an exemplary communication stack for a secure SMS-based mobile application, in accordance with an embodiment of the present invention. In FIG. 6, the communication stack of a secure SMS-based mobile application includes an application layer 602, a transport layer 604, a security layer 606, an SMS layer 608, and a data link layer 610. The right side of FIG. 6 shows the data frame at each layer. Transport layer 604 compresses payload 612 in application layer 602 and attaches appropriate headers to obtain data frame 614. Security layer 606 encrypts the compressed payload and attaches the MAC, resulting in data frame 616. For encryption schemes that use 128-bit block ciphers, the encrypted payload typically can include multiples of 128 bits. The MAC can be 80 bits long. SMS layer 608 encodes data frame 616 using Base64 encoding, which can expand the payload. The encoded data frame is then fitted into SMS data frames 618 and 620, each having a length of 1120 bits.

Figure 7A:
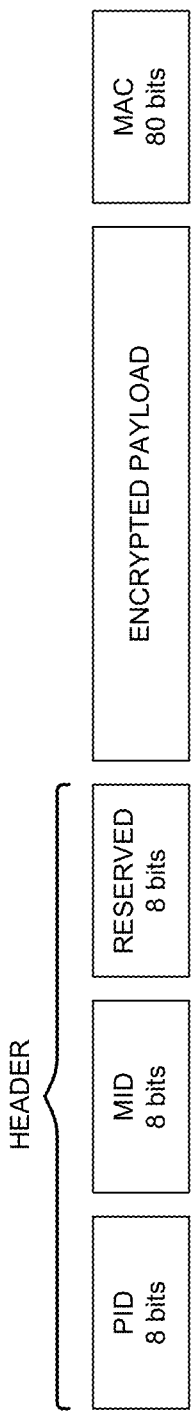
FIG. 7A presents a diagram illustrating an exemplary message format for the secure SMS-based mobile application, in accordance with an embodiment of the present invention.

FIG. 7A presents a diagram illustrating an exemplary message format for the secure SMS-based mobile application, in accordance with an embodiment of the present invention. In FIG. 7A, the message header includes an 8-bit protocol identifier (PID) field, an 8-bit message ID (MID) field, and an 8-bit reserved field. The message further includes the encrypted payload field and the 80-bit MAC field. Note that the MAC is computed over both the header and the payload.

Figure 7B:
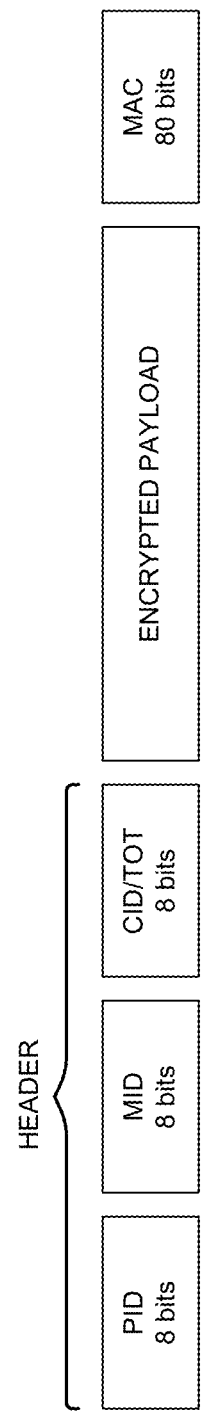
FIG. 7B presents a diagram illustrating an exemplary message format for the secure SMS-based mobile application, in accordance with an embodiment of the present invention.

FIG. 7B presents a diagram illustrating an exemplary message format for the secure SMS-based mobile application, in accordance with an embodiment of the present invention. In FIG. 7B, the message is a concatenated SMS message, which has a similar format to that of FIG. 7A, except that the header now includes an 8-bit CID/TOT field that indicates the message sequence in the concatenated SMS message and the total number of messages.

There are various levels of security that can be achieved in practice, including the Chosen-Plaintext Attack (CPA) security and the Chosen-Ciphertext Attack (CCA) security. CPA security is also called semantic security, meaning that the adversary gains no significant advantage from the ability to encrypt any plaintext. CPA is about passive attacks and is often considered the bare minimum desirable security level. On the other hand, CCA security ensures that an adversary gains no significant advantage from the ability to decrypt ciphertext. In other words, CCA guarantees that an adversary cannot learn any information about the underlying plaintext given a ciphertext even with access to the decryption of other ciphertext of its choice. CCA security provides stronger protection than CPA security but is harder to achieve in practice. For example, AES-CTR is CPA-secure but not CCA-secure.

In embodiments of the present invention, the AES-CTR scheme is transferred into a CCA-secure scheme using an encrypt-then-MAC process, because authenticated encryption is CCA-secure. Most CCA attacks rely on the attacker modifying the challenge and then feeding it to the decryption oracle whose answer enables the attacker to tell which message was encrypted. However, authenticated encryption schemes can recognize improperly constructed ciphertext and refuse to decrypt it. Hence, by including a MAC on top of the encryption, one can prevent the attacker from fiddling with the ciphertext, thus essentially rendering the decryption oracle useless.

Figure 8:
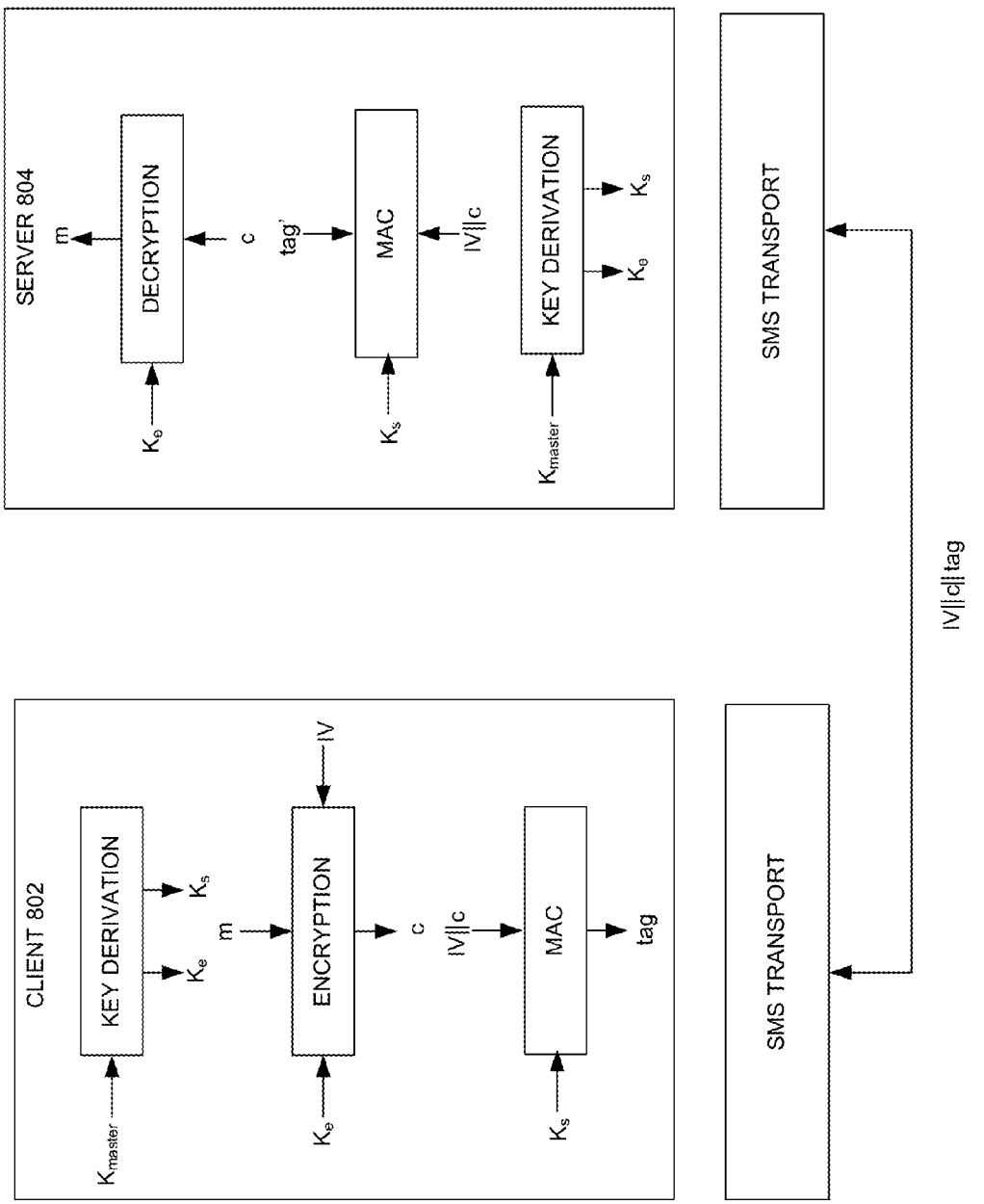
FIG. 8 presents a diagram illustrating an exemplary encrypted communication protocol, according to an embodiment of the present invention.

FIG. 8 presents a diagram illustrating an exemplary encrypted communication protocol, according to an embodiment of the present invention. In FIG. 8, client 802 derives a signing key ($K_s$) and an encryption key ($K_e$) from a master key, which is a shared secret between client 802 and server 804. One simple way to derive $K_s$ and $K_e$ is to hash the master key with SHA-256 and use the beginning 128 bits as the encryption key and the ending 128 bits as the signing key. AES-CTR is used to encrypt the message (m), which takes as input the plaintext message (m), the encryption key ($K_e$), and an IV of the same length as the encryption key. A 128-bit IV can be constructed by concatenating a 64-bit nonce with a 64-bit message counter. The ciphertext (c) can be generated as c=AES-CTR(m, IV, $K_e$). If the message is longer than 128 bits, it needs to be split and if needed padded into blocks of 128 bits.

Both the IV and the ciphertext are used for building the MAC. In some embodiments, HMAC is used to compute a tag as: tag=SHA-256($K_s$∥SHA-256($K_s$∥IV∥MID∥c)). Note that it is important to apply the MAC to all elements sent over the SMS channel, not only the cipher text. Although the tag as calculated here is 256 bits, it can be truncated to 80 bits in order to reduce overhead while still providing strong authentication. The IV, the ciphertext, and the tag are transported over the SMS channel as shown in FIG. 8. Also shown in FIG. 8, server 804 derives the signing key ($K_s$) and the encryption key ($K_e$), verifies the tag, and decrypts the ciphertext.

There are various approaches in reducing the communication overhead resulting from the added security layer. For example, the IV is sent along with the ciphertext, and one can reduce the length of each transmitted IV by transmitting the nonce at the key establishment phase. As a result, only the message counter part of the IV needs to be transmitted.

The overhead can be further reduced by not transmitting the IV at all. Instead, the message ID (as shown in FIGS. 7A-7B) can be used to replace the message counter. However, the message ID is only 8 bits long, and thus only counts up to 256 messages. To overcome this, one can update the master key for every 256 messages. Another option is to maintain a locally cached counter that is incremented every 256 messages and use the SHA-256 of the nonce, the cached-counter, and the message ID as IV, i.e., IV=SHA-256(nonce∥cached_counter∥MID). In other words, the client and the server no longer need to communicate the IV, and only need to update their cached counter every 256 packets. This approach provides a nice tradeoff between ease-of-implementation, efficiency, and resilience. More specifically, this encryption scheme does not increase the communication overhead at all. Another approach for reducing the IV overhead relies on hashing the previous IV to generate the next IV.

As explained previously, key-ratcheting can further enhance security. Moreover, when key-ratcheting is performed, even not for each message, there is no longer a need for IV, as shown in FIGS. 3A-3B. Although ratcheting adds additional overhead, adaptive ratcheting (as illustrated in FIG. 4) can reduce the overall overhead, while still providing a high level of security.

Another approach for reducing the communication overhead for the SMS-based application is to reduce the overhead caused by the transmission of the MACs. One way to do so is to use one MAC for a group of messages instead of using a single MAC for every message. However, this may result in increased retransmission, because one corrupted message in the group can require the retransmission of all messages in the group. Another approach includes not using MAC at all, and relies on the known structure of the transmitted message to provide authentication. However, this may weaken the security protection.

In addition, in situations where a long series of SMS messages are exchanged, it might be useful to consider the use of hash trees (also known as Merkle trees). In conjunction with a MAC, these hash trees allow for more efficient error detection at the expense of a slightly larger overhead.

In general, embodiments of the present invention provide ways for ensuring security in SMS-based communications. By performing symmetric encryption with key-ratcheting operations that are adaptive to user behavior as well as the network environment, the communication overhead resulting from the ratcheting can be reduced, without compromising the security.

Computer and Communication System

Figure 9:
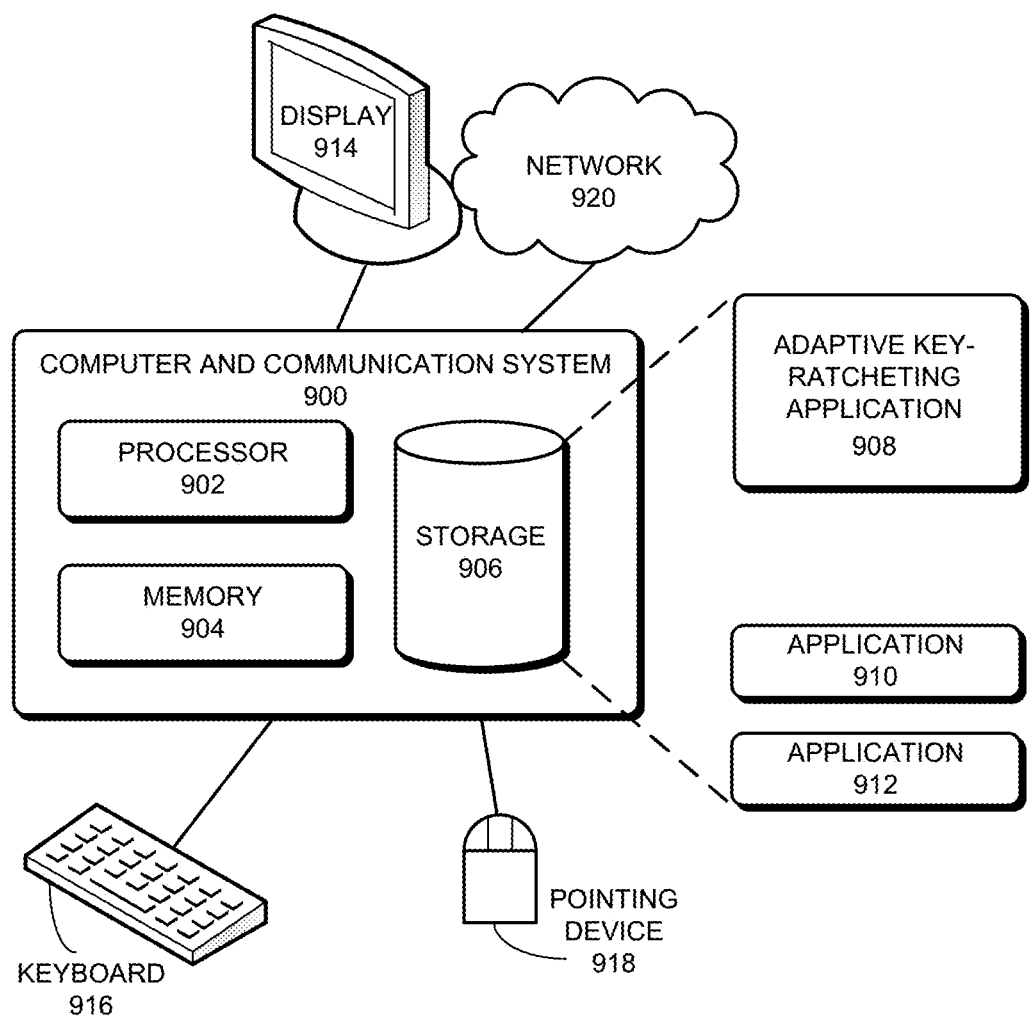
FIG. 9 illustrates an exemplary computer and communication system for adaptive key ratcheting, in accordance with one embodiment of the present invention.

FIG. 9 illustrates an exemplary computer and communication system for adaptive key-ratcheting, in accordance with one embodiment of the present invention. In one embodiment, a computer and communication system 900 includes a processor 902, a memory 904, and a storage device 906. Storage device 906 stores an adaptive key-ratcheting application 908, as well as other applications, such as applications 910 and 912. During operation, adaptive key-ratcheting application 908 is loaded from storage device 906 into memory 904 and then executed by processor 902. While executing the program, processor 902 performs the aforementioned functions. Computer and communication system 900 is coupled to an optional display 914 which can include a touchscreen display, a keyboard 916, a pointing device 918, and can also be coupled via one or more network interfaces to a network 920.

In some embodiments, applications 908, 910, and 912 can be partially or entirely implemented in hardware and can be part of processor 902. Further, in some embodiments, the system may not include a separate processor and memory. Instead, in addition to performing their specific tasks, applications 908, 910, and 912, either separately or in concert, may be part of general- or special-purpose computation engines.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for enhancing security in a secure communication channel, comprising:
   collecting, by a mobile device, contextual information associated with the mobile device or a user of the mobile device;
   determining whether a trigger condition is met based on the collected contextual information, wherein determining whether the trigger condition is met comprises determining available communication bandwidth and security risk associated with the mobile device;
   in response to determining that the trigger condition is met, performing a first type of key-ratcheting operation on a current cryptographic key to update the cryptographic key;
   in response to determining that the trigger condition is not met, performing a second type of key-ratcheting operation on the current cryptographic key to update the cryptographic key, wherein the first type of key-ratcheting operation provides a higher level of security and requires a larger communication overhead than the second type of key-ratcheting operation; and
   encrypting a to-be-sent message using an encryption key associated with the updated cryptographic key.

2. The method of claim 1, wherein the first type of key-ratcheting operation comprises a Diffie-Hellman key-ratcheting operation, and wherein the second type of key-ratcheting operation comprises a hash-based key-ratcheting operation.

3. The method of claim 1, wherein the contextual information includes one or more of:
   a time interval since a previous key-ratcheting operation of the first type is performed;
   a current bandwidth of the communication channel;
   the user's location;
   the user's motion patterns;
   network traffic patterns; and
   a battery life of the mobile device.

4. The method of claim 1, wherein the secure communication channel includes one or more of:
   a Wi-Fi channel;
   a channel over 3G or 4G cellular networks; and
   a short message service (SMS) channel.

5. The method of claim 1, wherein the encryption key is derived from the updated cryptographic key using a hash-based key derivation function (HKDF).

6. The method of claim 1, further comprising:
   computing a message authentication code (MAC) over the encrypted message; and
   transmitting the encrypted message along with the MAC over the secure communication channel.

7. A non-transitory computer-readable storage medium storing instructions that when executed by a computer cause the computer to perform a method for enhancing security in a secure communication channel, the method comprising:
   collecting, by a mobile device, contextual information associated with the mobile device or a user of the mobile device;
   determining whether a trigger condition is met based on the collected contextual information, wherein determining whether the trigger condition is met comprises determining available communication bandwidth and security risk associated with the mobile device;
   in response to determining that the trigger condition is met, performing a first type of key-ratcheting operation on a current cryptographic key to update the cryptographic key;
   in response to determining that the trigger condition is not met, performing a second type of key-ratcheting operation on the current cryptographic key to update the cryptographic key, wherein the first type of key-ratcheting operation provides a higher level of security and requires a larger communication overhead than the second type of key-ratcheting operation; and encrypting a to-be-sent message using an encryption key associated with the updated cryptographic key.

8. The non-transitory computer-readable storage medium of claim 7, wherein the first type of key-ratcheting operation comprises a Diffie-Hellman key-ratcheting operation, and wherein the second type of key-ratcheting operation comprises a hash-based key-ratcheting operation.

9. The non-transitory computer-readable storage medium of claim 7, wherein the contextual information includes one or more of:
   a time interval since a previous key-ratcheting operation of the first type is performed;
   a current bandwidth of the communication channel;
   the user's location;
   the user's motion patterns;
   network traffic patterns; and
   a battery life of the mobile device.

10. The non-transitory computer-readable storage medium of claim 7, wherein the secure communication channel includes one or more of:
    a Wi-Fi channel;
    a channel over 3G or 4G cellular networks; and
    a short message service (SMS) channel.

11. The non-transitory computer-readable storage medium of claim 7, wherein the encryption key is derived from the updated cryptographic key using a hash-based key derivation function (HKDF).

12. The non-transitory computer-readable storage medium of claim 7, wherein the method further comprises:
    computing a message authentication code (MAC) over the encrypted message; and
    transmitting the encrypted message along with the MAC over the secure communication channel.

13. A computer system, comprising:
    a processor; and
    a storage device coupled to the processor and storing instructions which when executed by the processor cause the processor to perform a method for enhancing security in a secure communication channel, wherein the method comprises:
        collecting contextual information associated with a mobile device or a user of the mobile device;
        determining whether a trigger condition is met based on the collected contextual information, wherein determining whether the trigger condition is met comprises determining available communication bandwidth and security risk associated with the mobile device;
        in response to determining that the trigger condition is met, performing a first type of key-ratcheting operation on a current cryptographic key to update the cryptographic key;
        in response to determining that the trigger condition is not met, performing a second type of key-ratcheting operation on the current cryptographic key to update the cryptographic key, wherein the first type of key-ratcheting operation provides a higher level of security and requires a larger communication overhead than the second type of key-ratcheting operation; and
        encrypting a to-be-sent message using an encryption key associated with the updated cryptographic key.

14. The computer system of claim 13, wherein the first key-ratcheting operation comprises a Diffie-Hellman key-ratcheting operation, and wherein the second key-ratcheting operation comprises a hash-based key-ratcheting operation.

15. The computer system of claim 13, wherein the contextual information includes one or more of:
    a time interval since a previous key-ratcheting operation of the first type is performed;
    a current bandwidth of the communication channel;
    the user's location;
    the user's motion patterns;
    network traffic patterns; and
    a battery life of the mobile device.

16. The computer system of claim 13, wherein the secure communication channel includes one or more of:
    a Wi-Fi channel;
    a channel over 3G or 4G cellular networks; and
    a short message service (SMS) channel.

17. The computer system of claim 13, wherein the method further comprises:
    computing a message authentication code (MAC) over the encrypted message; and
    transmitting the encrypted message along with the MAC over the secure communication channel.

* * * * *